Patented Feb. 13, 1945

2,369,339

UNITED STATES PATENT OFFICE 2,369,339

MERCURI-ACETYLIDE COMPOUNDS AND METHOD OF PREPARING SAME

Morris H. Daskais, Chicago, Ill., assignor to Research Corporation, a corporation of New York No Drawing. Original application October 9, 1939, Serial No. 298,635. Divided and this application November 23, 1942, Serial No. 466,663

8 Claims. (Cl. 260—313)

The present invention relates to a new series of mercuri-acetylide compounds and to methods of producing the same. It will be fully understood from the following description, illustrated by specific examples of compounds of the present invention and their preparation.

This application is a division of my copending application Serial No. 298,635, filed October 9, 1939.

Various mercuri-acetylide derivatives have been prepared by methods hitherto described; for example, various bis-alkoxy-alkyl-mercuri-acetylides have been prepared by the method of Nieuwland et al. (J. Am. Chem. Soc., vol. 55 (1933), pp. 2465, 3728), of which bis-$\beta$-methoxyethyl-mercuri-acetylide may be regarded as typical. In general, such compounds have little or no solubility in water and in weak alkaline aqueous solutions and are soluble only with difficulty in such organic solvents as methanol, ethanol and acetone. Hence the use of such compounds is restricted, particularly where fungicidal and germicidal effects are desired.

In accordance with the present invention, I have prepared a new series of mercuri-acetylide compounds which are characterized by solubility in dilute aqueous alkaline solutions or water or both.

In carrying out the process of the present invention, I preferably employ a mercuri-acetylide compound of the general formula

$$R_1-O-R_2-Hg-C\equiv C-Hg-R_2-O-R_1$$

in which $R_1$ represents an alkyl group and $R_2$ a hydrocarbon radical of the class consisting of the aliphatic and alicyclic groups. Such compounds may be prepared by the method of Nieuwland et al., above referred to. I react upon such a compound with an organic nitrogen compound generally which has an amido or imido radical containing a replaceable labile or acidic hydrogen atom, thereby replacing the $R_1$—O— or alkoxy group of the mercuri-acetylide compound. Organic nitrogen compounds having the characteristics above set forth which I have employed in carrying out my reaction include the amides and imides of carboxylic and sulfonic acids, and also various pyrroles and pyrrole derivatives, morpholine and the like. For example, I have used acetamide, propionamide, urea, benzamide, salicylamide, phthalimide, succinimide, 5,5-diethylbarbituric acid, benzene sulfonamide, amino-benzene sulfonamide, paratoluene sulfonamide, morpholine, carbazole, and pyrrole.

The reaction is preferably conducted in the presence of an organic solvent in which the reactants are partially or completely soluble. It is preferred that the solvent selected has a boiling point below the melting point of the mercuri-acetylide compound used in the reaction and that the reactants be completely dissolved, although these conditions are not essential. The solvent does not appear to take part in the reaction. For example, methanol, ethanol, isopropanol, sec.-butanol, toluol, benzol, methylethyl ketone, acetone, butyl or ethyl acetates or propionates or the like may be employed as solvents.

In the resulting compounds, one valence of each mercury atom is bonded to an acetylenic carbon atom and the other to a carbon atom of a hydrocarbon group which is apparently bonded to a nitrogen atom of an organic nitrogen compound and preferably to a nitrogen atom of an amido or imido group in the organic nitrogen compound. This structure is indicated by the fact that, when reacted upon with sodium stannite, the compounds produced yield metallic mercury very slowly as contrasted with compounds having a mercury nitrogen linkage, which, with the same reagent yield metallic mercury quickly.

The compounds produced in accordance with my invention have the probable general formula

$$(A)-R-Hg-C\equiv C-Hg-R-(A)$$

wherein (A)— is an organic nitrogen-containing group of the class consisting of substituted amido and substituted imido groups and R is a hydrocarbon radical of the class consisting of the aliphatic and alicyclic hydrocarbon radicals, the nitrogen atom of the nitrogen-containing group being bonded to a carbon atom of the hydrocarbon radical.

As hereinbefore set forth, the new compounds produced in accordance with the present invention are characterized by their solubility in water, dilute aqueous alkaline solutions or both, as well as various organic solvents.

The compounds of my invention are of particular value as germicides and fungicides, for example, in the treatment of wood, in cut or uncut form to prevent fungus diseases such as "blue stain" on lumber, and in the treatment of seed to disinfect and immunize the same against infection. These compounds are substantially odorless and, for all practical purposes, are non-corrosive to iron, hence lending themselves for use in iron machinery and the like. An outstanding advantage of the compounds in accordance with my invention is the fact that they are non-vesicant and do not irritate or cause blistering of the skin, thereby enabling them to be handled without fear of injuriously affecting the operator or user. I have found that seeds can tolerate large amounts of the compounds of my invention and the treated seed is stable and undergoes substantially no deterioration in storage.

The following examples illustrate methods of preparing soluble organic mercury compounds in accordance with my invention. It is, of course, to be understood that my invention is not to be construed as limited to the proportions and details of the methods therein set forth, since various modifications thereof will be apparent and are intended to be included within the scope of my invention as defined by the appended claims. In the examples, the term "parts" indicates parts by weight.

*Example 1*

20 parts of bis-beta-methoxyethyl-mercuri-acetylene and 13 parts of phthalimide are dissolved in about 300 parts of isopropyl alcohol. The solution is refluxed for about two hours, at which time the reaction is completed, and the

solvent is removed as by vacuum distillation. The reaction product, apparently the compound bis-beta-phthalimido-N-ethyl-mercuri-acetylene, is dried in vacuo. The compound is soluble in warm aqueous sodium carbonate and in boiling water. It sinters at 142° C. and melts completely at 166° C.

In tests conducted by me I have found that this compound will kill the "sap stain" fungi, *Ceratostomella pilifera* and *Graphium rigidum* in a nutrient agar medium in a concentration less than 1 part per million. This reaction product is also toxic to the wood rotters, *Fomes annosus* and *Lenzites trabea* in concentrations of one-half part per million.

The compound bis-beta-phthalimido-N-ethyl-mercuri-acetylene is effective as a "blue stain" preventative. Thus, for example, a mixture containing 5% to 10% of this compound and 95% to 90% of sodium carbonate is dissolved in about 400 times its weight in water to form an impregnating solution which is especially suitable for this purpose. The wood, either "green" or partially dried, is dipped into this impregnating solution and the wood is thereby protected against the action of stain and rot fungi.

This phthalimido compound is also especially suitable as a dry seed disinfectant. For this purpose, it is mixed with the usual inert diluents such as, for example, talc, starch, kieselguhr, chalk, clay or gypsum, with or without a wetting agent. Thus, for example, a uniform and intimate mixture of about 5 parts by weight of bis-beta-phthalamido-N-ethyl-mercuri-acetylene in about 95 parts of talc provides a highly effective immunizer against seed-borne fungus diseases when used in the ratio of about one-half to about 2 ounces per bushel of seed.

*Example 2*

10 parts of bis-gamma-methoxypropyl-mercuri-acetylene and 4 parts of succinimide are dissolved in about 200 parts of dioxan. The solution is refluxed for about two hours at which time the reaction is complete, and the solvent is removed as by vacuum distillation. The reaction product, which appears to have the formula

is dried in vacuo. The product is soluble in water, aqueous sodium carbonate, acetone, methanol and is an effective germicide and fungicide. The compound does not deposit mercuric oxide when treated with caustic soda and yields metallic mercury slowly on the addition of sodium stannite.

If desired, the compounds bis-beta-ethoxyethyl-mercuri-acetylene, bis-delta-propyloxybutyl-mercuri-acetylene, bis-cyclohexyloxyethyl-mercuri-acetylene and the like may be reacted with succinimide as in Example 2 to obtain products similar to that obtained in accordance with this example.

I claim:

1. The compound, bis-beta-phthalimido-N-ethyl-mercuri-acetylene.

2. The compound having the formula

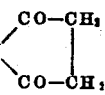

3. The method of preparing soluble organic mercury compounds which comprises reacting a mercuri-acetylide compound having the general formula

wherein $R_1$ represents an alkyl group and $R_2$ a hydrocarbon radical of the class consisting of the aliphatic and alicyclic radicals, with phthalimide.

4. The method of preparing soluble organic mercury compounds which comprises reacting a mercuri-acetylide compound having the general formula

wherein $R_1$ represents an alkyl group and $R_2$ a hydrocarbon radical of the class consisting of the aliphatic and alicyclic radicals, with succinimide.

5. The method of preparing soluble organic mercury compounds which comprises reacting a mercuri-acetylide compound having the general formula

wherein $R_1$ represents an alkyl group and $R_2$ a hydrocarbon radical of the class consisting of the aliphatic and alicyclic radicals, with an organic compound containing a diacyl bonded nitrogen atom leaving only one replaceable hydrogen atom.

6. The method of preparing soluble organic mercury compounds which comprises reacting a mercuri-acetylide compound having the general formula

wherein $R_1$ represents an alkyl group and $R_2$ a hydrocarbon radical of the class consisting of the aliphatic and alicyclic radicals, with an amide having the general formula $R_2'$ NH wherein $R_2$ is an acyl radical and wherein each carbonyl group of the acyl radical is carbon bonded to the nitrogen atom.

7. A symmetrical organic mercury compound of the general formula

wherein (A) is an organic radical containing a diacyl imido nitrogen atom and R is a hydrocarbon radical of the class consisting of the aliphatic and alicyclic hydrocarbon radicals, the said nitrogen atom of radical (A) being bonded to a carbon atom of the hydrocarbon radical R.

8. A symmetrical organic mercury compound of the general formula (A)—R—Hg—C≡C—Hg—R—(A)

wherein (A) is a dicarboxylic acid amide radical and R is a hydrocarbon radical of the class consisting of the aliphatic and alicyclic hydrocarbon radicals, the said nitrogen atom of radical (A) being bonded to a carbon atom of the hydrocarbon radical R.

MORRIS H. DASKAIS.